United States Patent Office 3,338,673
Patented Aug. 29, 1967

3,338,673
RECOVERY OF SUBSTANTIALLY ANHYDROUS HYDROGEN FLUORIDE FROM AN IMPURE AQUEOUS AMMONIUM FLUORIDE SOLUTION
John A. Peterson, Niagara Falls, Joseph J. Wylegala, Grand Island, and John T. Rucker and Lewis E. Tufts, Lewiston, N.Y., assignors to Hooker Chemical Corporation, Niagara Falls, N.Y., a corporation of New York
Filed Oct. 2, 1964, Ser. No. 401,057
6 Claims. (Cl. 23—153)

ABSTRACT OF THE DISCLOSURE

A method for recovering substantially anhydrous hydrogen fluoride from an aqueous ammonium fluoride solution which contains a total of sulfate and phosphate values of at least 2% by weight, wherein the ammonium fluoride solution is heated to form a gaseous mixture of ammonia, HF and water vapor, which gas mixture is reacted to form an ammonium bifluoride product. The ammonium bifluoride product is returned to the heated ammonium fluoride solution and the process continued until substantially all of the water is removed from the ammonium fluoride solution and the ammonium bifluoride product returned is a mixture of ammonium fluoride salts, of which at least 70% is ammonium bifluoride, with the phosphate and sulfate values. A substantially pure ammonium bifluoride is then obtained from this product by distillation and this ammonium bifluoride is then reacted with an alkali metal fluoride to form an alkali metal bifluoride and a gaseous decomposition product containing ammonia, HF and water vapor. This gaseous decomposition product is then reacted to form an ammonium bifluoride product which is returned to the alkali metal fluoride-ammonium bifluoride reaction and the alkali metal bifluoride which has been formed is thermally decomposed to form an alkali metal fluoride and a substantially anhydrous hydrogen fluoride which is recovered as the product of the process.

---

Figure 1:
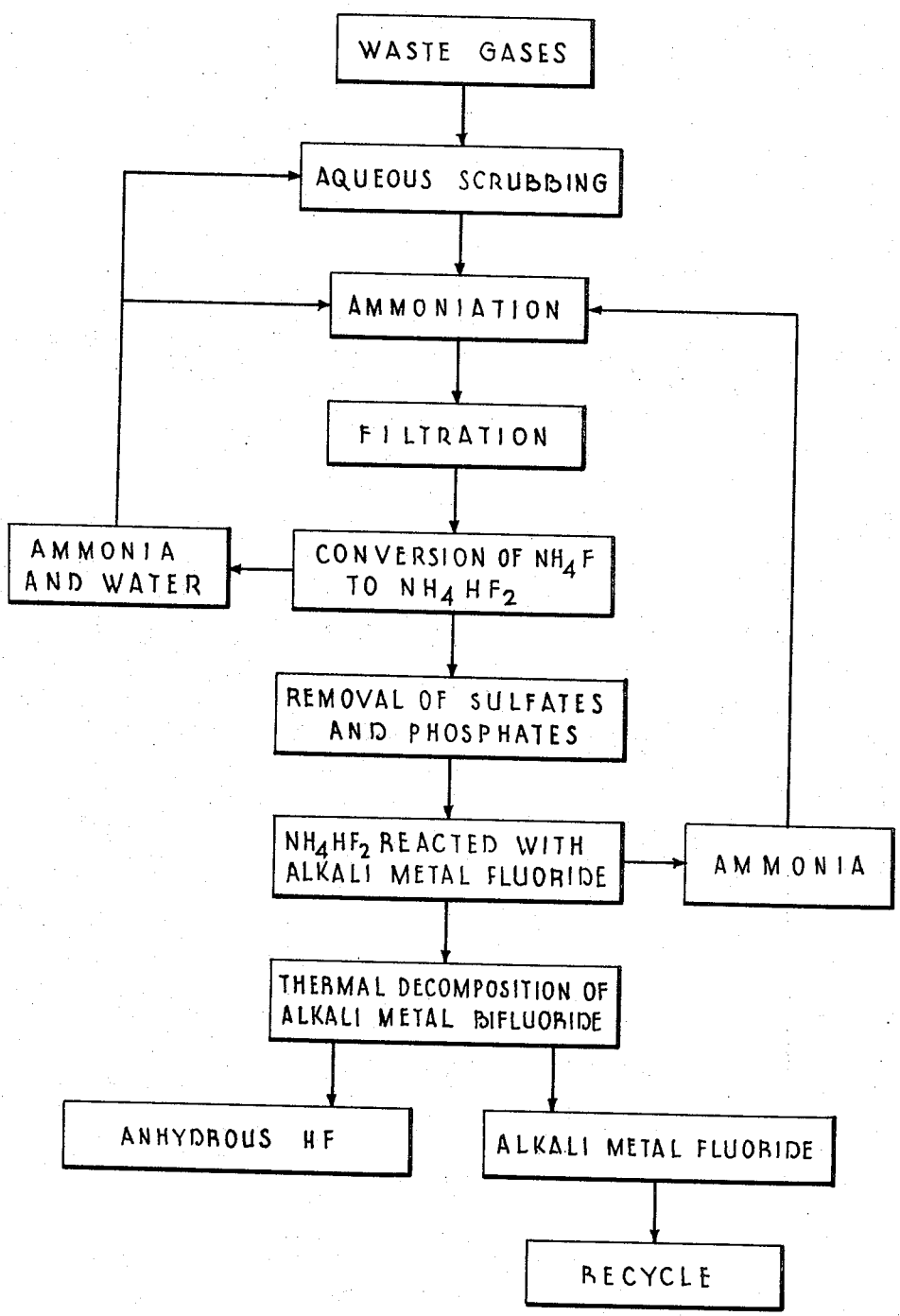

This invention relates to the recovery of anhydrous hydrogen fluoride from aqueous solutions. More particularly, this invention relates to the recovery of fluorine values from waste gases by aqueous scrubbing, and the purification and isolation of the fluorine values so as to recover anhydrous hydrogen fluoride from the scrubber liquids.

Hydrogen fluoride is a chemical reactant useful for the formation of various fluorine compounds. As such, it is preferably used in an anhydrous state, although because of its reactivity and the sources from which it is obtained, the processes which have been proposed to separate it in such state are numerous and often very complex.

In recent years, interest in the recovery of hydrogen fluoride from waste or flue gases containing minor percentages of fluorine has increased. Since most volatile and soluble fluorine values, particularly as hydrogen fluoride, are extremely corrosive, toxic and odoriferous, it is highly desirable to remove them from waste gases prior to venting to the atmosphere. The diminishing supply of hydrogen fluoride from conventional sources, such as the calcination or acidulation of fluorspar and cryolite, and the increasing demand for hydrogen fluoride, have made it economically attractive to recover an anhydrous hydrogen fluoride the minor percentages of fluorine contained in certain waste gases. This increased demand for hydrogen fluoride has resulted in the need for new and better methods of separating it from various mixtures in which it has been concentrated after being recovered from such waste gases.

One method of recovering fluorine values from waste gases is the aqueous scrubbing of the gases and the absorption of the fluorine values in an aqueous liquor. The waste gases scrubbed in this manner contain only minor percentages of fluorine values in addition to various other gases, such as $SO_2$, $H_2O$, $N_2$, $CO_2$, CO, and suspended fine dust. The fluorine values contained in minor percentages are normally in the form of hydrogen fluoride and silicon tetrafluoride. Many of these undesirable gases are also absorbed in the scrubbing liquor and should be separated therefrom prior to isolating anhydrous hydrogen fluoride. It has been found that by ammoniating the scrubber liquor, most of the undesirable contaminants are precipitated and an aqueous filtrate containing ammonium fluoride can be removed.

It is an object of this invention to provide methods of recovering anhydrous hydrogen fluoride from scrubber liquors. Another object of this invention is to provide methods of converting aqueous ammonium fluoride to alkali metal bifluorides. A further object of this invention is to provide methods of forming alkali metal bifluoride salts and methods of decomposing alkali metal bifluorides to recover hydrogen fluoride therefrom. These and other objects will become apparent to those skilled in the art from the description of the invention.

In accordance with the invention, waste gases are scrubbed with an aqueous solution to absorb fluorine values, the scrubber liquors containing fluorine values are ammoniated to form ammonium fluoride, the ammonium fluoride is separated as filtrate and reacted with an alkali metal fluoride to form an anhydrous alkali metal bifluoride and the alkali metal bifluoride is thereafter pyrolyzed to recover anhydrous hydrogen fluoride and alkali metal fluoride.

The present invention presents a method of separating highly complex gas mixtures so as to isolate therefrom the minor percentages of fluorine values as hydrogen fluoride in substantially pure, anhydrous condition. The present method provides means of separating the contaminants which are likely to be retained with the fluoride values during processing. Methods are also provided for converting ammonium fluoride salts to alkali metal bifluoride salts and for recovering anhydrous hydrogen fluoride from said alkali metal bifluoride salts.

Gases produced in the acidulation or calcination of phosphate rocks are complex mixtures of chemicals which are, for the most part, too dilute or impure to warrant economical recovery. However, these waste gases normally contain minor percentages of fluorine values present in the form of hydrogen fluoride, silicon tetrafluoride, and the like. The recovery of these fluorine values from the waste gas stream is desirable, provided an economical and effective recovery and isolation process can be applied thereto. The gas streams to which this invention is applicable have compositions varying widely with the particular process and the phosphate rock composition used. Waste gas streams may contain the following constituents within the indicated concentrations by weight.

| | Percent |
|---|---|
| Fluorine values | 0.1 to 5.0 |
| Sulfate values (as $SO_2$) | 0.0 to 10.0 |
| Water | 0.1 to 40 |
| Phosphate values | 0.0 to 5.0 |
| Nitrogen | 0.0 to 40 |
| Oxygen | 0.0 to 20 |
| Carbon dioxide | 0.0 to 20 |
| Carbon monoxide | 0.0 to 20 |
| Suspended solids | 0.0 to 20 |

The process of this invention is commenced by scrubbing the waste gases described with an aqueous solution. Suitable scrubbing solutions are water and dilute aqueous hydrogen fluoride. Conventional scrubbing apparatuses are employed. The scrubbing liquor is preferably maintained at a pH of 2 to 4 during the scrubbing process to reduce the absorption of sulfur dioxide. If the waste gas stream contains appreciable amounts of dust or suspended solids, an electrostatic precipitator, filters, or the like, are preferably employed to reduce the dust content prior to passing the gas through the scrubbing system.

In the scrubbing system the pH of the aqueous liquor is controlled within the preferred range of 2 to 4 by additions of ammonia. Scrubber liquor removed from the scrubbing system is ammoniated to a pH of at least 8 to precipitate hydrous silica. The liquor is then filtered to remove the precipitated silica and other solids which may have been absorbed during the scrubbing operation. The filtrate comprises a solution of ammonium fluoride having a concentration of about 10 percent to 50 percent. This concentration will vary, depending on the volume of gases passed through the scrubbing system and the degree of recirculation of the scrubbing liquors. The actual concentration of ammonium fluoride in the filtrate can vary widely and may range from as low as about 10 percent up to about 50 percent ammonium fluoride by weight, the more concentrated solutions being preferred.

By ammoniating the scrubber liquors, the fluorine values contained therein are converted to ammonium fluoride. Silicon tetrafluoride absorbed in the scrubber liquids is converted to ammonium fluoride, resulting in the precipitation of silicon dioxide according to the reaction:

$$4NH_3 + 2H_2O + SiF_4 \rightarrow SiO_2 + 4NH_4F.$$

The recovery of fluorine values from ammonium fluoride solution as anhydrous hydrogen fluoride proceeds according to the present invention by one of two routes, depending on whether the ammonium fluoride filtrate is highly contaminated with sulfate and phosphate values or whether it is relatively low in such contaminants.

Figure 2:
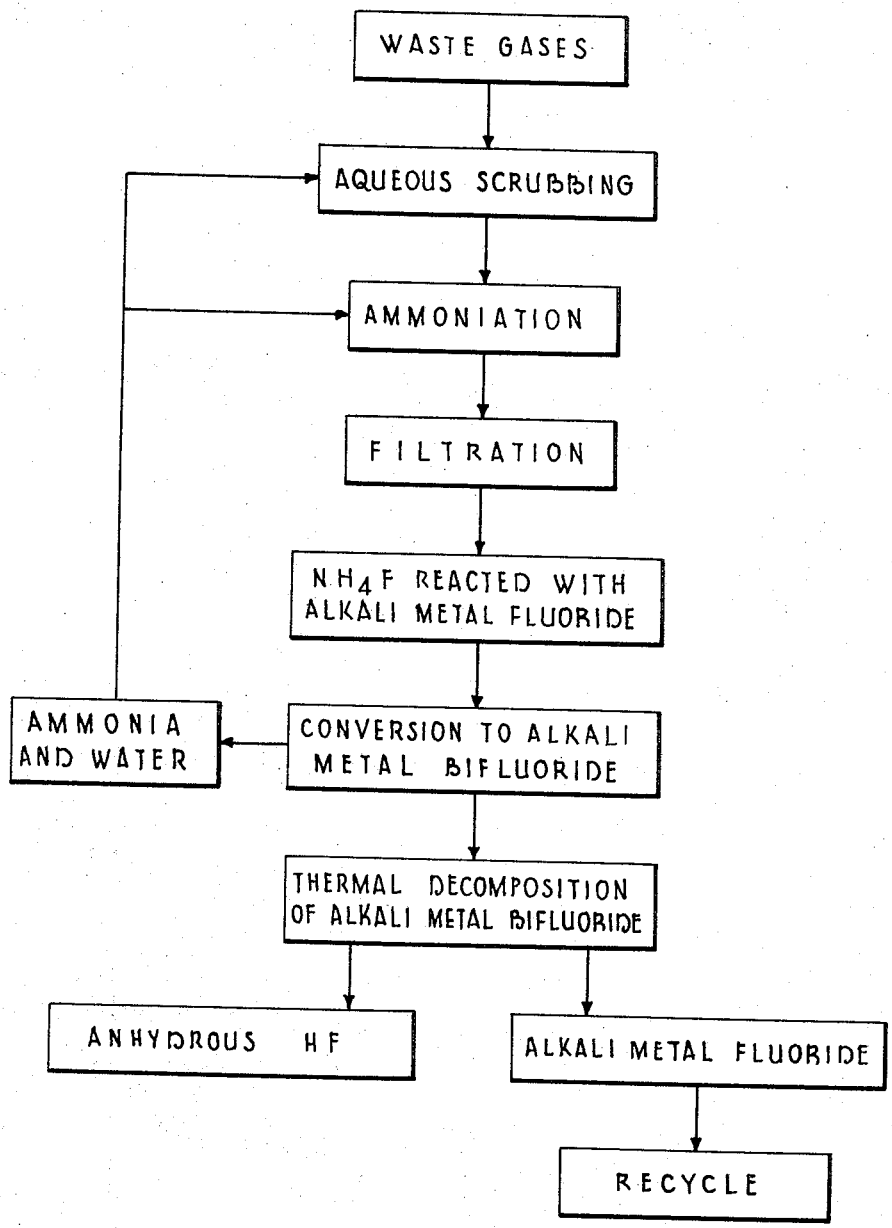

The process of this invention is readily understood by reference to the drawings in which FIG. 1 is a flow sheet of the process of this invention wherein the contamination by sulfate and phosphates is high; and FIG. 2 is a flow sheet of the process of this invention in which sulfate and phosphate contamination is low.

HIGH SULFATE AND PHOSPHATE CONTAMINATION

The sulfate and phosphate contamination is considered high when the quantity of either sulfate or phosphate is such that the alkali metal fluoride recycled within the system is contaminated with these non-volatile anions at an excessive rate. Normally, if the ammonium fluoride filtrate contains more than about 2% sulfate value, 2% phosphate value, or a total sulfate and phosphate value of more than about 2% by weight, then the contamination is considered high.

The ammonium fluoride filtrate is converted to ammonium bifluoride by heating to a temperature sufficient to volatilize the water and some of the ammonia. This conversion may be effected by heating the aqueous solution to 100 to 150 degrees centigrade to drive off the water and convert the ammonium fluoride to ammonium bifluoride. The reaction effected is:

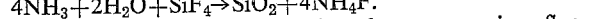

$$2NH_4F(aqueous) \rightarrow NH_4HF_2 + NH_3\uparrow + H_2O\uparrow$$

A more preferred method is to effect the conversion and dehydration by heating the ammonium fluoride solution at a temperature of 130 degrees centigrade to 230 degrees centigrade, passing the gases evolved through a reaction zone maintained at a temperature of 100 degrees centigrade to 140 degrees centigrade, reacting in the reaction zone the volatilized hydrogen fluoride and part of the ammonia liberated during the dehydration and thereby forming ammonium bifluoride. Water and excess ammonia are exhausted from the reaction zone while the ammonium bifluoride produced in the reaction zone is returned to the ammonium fluoride being dehydrated. The process is continued until substantially all of the water is removed from the ammonium fluoride starting material and a conversion to ammonium bifluoride is effected. The reaction product returned to the ammonium fluoride being dehydrated, is a mixture of ammonium fluoride salts comprising about 70 percent to about 99 percent ammonium bifluoride.

The ammonia and water liberated are recycled to the scrubbing system or ammoniation process of the preceding steps. Thus, the requirement for additional ammonia is relatively small.

The heat conversion method of producing ammonium bifluoride from ammonium fluoride solutions effects a high conversion to an anhydrous bifluoride product without appreciable fluoride loss when a reaction zone for the volatilized gases is provided. Therefore, the preferred heat conversion method uses a high temperature for dehydration and for the conversion of ammonium fluoride to ammonium bifluoride in addition to a reaction zone for the volatilized gases. This effects a partial decomposition and liberation of hydrogen fluoride to result in a more complete dehydration and thermal conversion to the ammonium bifluoride salt.

Having formed substantially anhydrous ammonium bifluoride, a separation of the sulfate and phosphate values is effected by distillation of the ammonium bifluoride salt. The distillation is effected at 210 degrees centigrade to about 225 degrees centigrade under atmospheric pressures, but may also be effected at lower temperatures by the application of subatmospheric pressures. Superatmospheric pressures can also be used but are less preferred.

The distilled ammonium bifluoride obtained is a product low in sulfate and phosphate contaminants. The sulfates and phosphate values remain as still bottoms, the ammonium bifluoride is the distillate.

Having obtained a relatively pure ammonium bifluoride, anhydrous hydrogen fluoride is recovered therefrom by one of the following processes:

A. *Molten ammonium bifluoride reactant with alkali metal fluoride*

The reaction of ammonium bifluoride with an alkali metal fluoride, such as potassium fluoride, is effected by mixing and reacting molten ammonium bifluoride from the distillation procedure with the alkali metal fluoride at a temperature of about 125 degrees centigrade to about 230 degrees centigrade. Pure ammonium bifluoride melts at 126.1 degrees centigrade while mixtures containing small amounts of ammonium fluoride melt at somewhat lower temperatures. The reaction taking place with potassium fluoride is $2KF + NH_4HF_2 \rightarrow 2KHF_2 + NH_3$. The ammonia liberated during the reaction is preferably recycled to the ammoniation process for reuse. The reaction is readily effected at a temperature of 125 degrees centigrade to 175 degrees centigrade using finely divided potassium fluoride and agitating the mixture during the addition of the molten ammonium bifluoride, which agitation may be by fluidizing methods. The reaction is carried out in a vessel having suitable agitating means, temperature control means, and venting means for release of the ammonia liberated.

B. *Gaseous ammonium bifluoride reacted with alkali metal fluoride*

Another means of reacting the ammonium bifluoride with an alkali metal fluoride, such as potassium fluoride, is to effect the reaction directly from the distillation of ammonium bifluoride. Using this procedure, gaseous ammonium bifluoride is reacted with a bed of alkali metal fluoride maintained at a temperature of about 150 degrees centigrade to 225 degrees centigrade. It is preferred to use a stirred reactor to agitate the bed. Under the conditions of an elevated temperature of 150 degrees centigrade to 225 degrees centigrade, the loss of fluorine values is normally high. However, this fluorine loss can be reduced by the use of a second reactor in which the volatilized fluorine values are reacted with the excess ammonia present and returned as an ammonium fluoride-ammonium bifluoride melt to the stirred reactor. Such a reactor is similar to that previously described having a controlled internal temperature of 100 degrees centigrade to 140 degrees centigrade so as to favor the formation of ammonium bifluoride. The volatilized decomposition product passed to the reactor comprises primarily ammonia and minor amounts of fluorine values as hydrogen fluoride. These gases are reacted in the temperature controlled reactor according to the equation $$NH_3 + 2HF \rightarrow NH_4F + HF$$

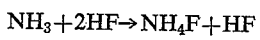

The fluoride salts are returned to the stirred reactor and the ammonia is recycled to the process of ammoniating scrubber liquors.

C. Reaction of ammonium bifluoride with molten alkali metal bifluoride-fluoride salt A further method of converting ammonium bifluoride to an alkali metal bifluoride salt, is to react gaseous, solid or liquid ammonium bifluoride with a molten potassium bifluoride salt composition maintained at 240 degrees centigrade to 270 degrees centigrade. The use of a molten potassium bifluoride salt composition provides improved heat transfer and fast, more complete reaction with the ammonium bifluoride. In addition, molten compositions provide ease of handling and ease of effecting intimate contact between reactants.

To effect reaction using the molten potassium bifluoride salt compositions, potassium fluoride is added in a proper molar ratio so as to maintain a slight excess of potassium fluoride and thereby effecting reaction with the ammonium bifluoride added to the molten potassium bifluoride composition. When using this method, it is preferred to again use a second reactor as previously described, to effect the reaction of hydrogen fluoride, also liberated, with the excess ammonia. Such a reactor reduces the loss of fluoride values from the reaction mixture by recombining them as an ammonium fluoride-ammonium bifluoride salt mixture and returning the salt mixture to the molten potassium bifluoride composition for further reaction.

In each of the methods recited for converting ammonium bifluoride to an alkali metal bifluoride salt, ammonia is evolved. The evolved ammonia is preferably recycled to the process of ammoniating the scrubber liquor or recovered for other uses. In continuous operation, only minor amounts of ammonia are lost from the reaction processes and, therefore, once equilibrium has been established throughout the system only minor amounts of ammonia are added to sustain the reactions.

METHODS OF RECOVERING ANHYDROUS HYDROGEN FLUORIDE FROM ALKALI METAL BIFLUORIDE SALTS

Anhydrous hydrogen fluoride is recovered from the alkali metal bifluoride by decomposition thereof. The decomposition of potassium bifluoride is typical of that of alkali metal bifluoride salts and proceeds according to the equation: $KHF_2 \rightarrow HF + KF$. The decomposition is effected by the pyrolysis of the alkali metal bifluoride salt according to the equation $MHF_2 \rightarrow HF + MF$ where M represents alkali metal ion. The reaction is effected by heating the alkali metal bifluoride to its decomposition temperature range and maintaining it at such a temperature to liberate gaseous hydrogen fluoride. The decomposition temperature is in the range of 270 degrees centigrade to about 600 degrees centigrade depending on the alkali metal bifluoride used. Sodium bifluoride decomposes in the lower portion of this temperature range without formation of a liquid melt. The decomposition of sodium bifluoride is thus readily effected in an externally heated reactor suitable for handling solids, such as a pug mill, dough mixer, sigma blade mixer, fluidizing apparatuses, and the like.

Potassium bifluoride decomposes in the higher portion of the noted temperature range, starting with molten $KHF_2$ and proceeding through a range of molten $KHF_2$-KF mixtures until solid KF remains. The decomposition of potassium bifluoride is readily effected by atomized spray techniques.

The atomized spray process is effected by spraying finely divided molten potassium bifluoride into a reactor having heated side walls. The material is preferably sprayed into the top of such a reactor while the internal temperature is maintained between about 400 degrees centigrade and 1000 degrees centigrade and more preferably 500 degrees centigrade to 800 degrees centigrade. The finely divided particles of potassium bifluoride are decomposed in situ to produce gaseous hydrogen fluoride and solid potassium fluoride. The reaction products are continuously withdrawn at high temperature from the reactor via a separation means, such as a cyclone separator, to remove the solids, thus permitting the recovery of gaseous anhydrous hydrogen fluoride.

This particular method of decomposing the potassium bifluoride is particularly advantageous for continuous rapid decomposition. The finely divided spray is instantly heated to its decomposition temperature, and a rapid and complete decomposition is effected.

AMMONIUM FLUORIDE SOLUTIONS LOW IN CONTAMINATION

FIG. 2 illustrates an alternate route for the recovery of anhydrous hydrogen fluoride from ammonium fluoride solutions. This route is used when the sulfate and phosphate content of such solutions is low.

For purposes of this specification, the term "low in sulfate and phosphate values" indicates ammonium fluoride solutions containing less than about 2% sulfate values, less than about 2% phosphate values, or a total sulfate and phosphate content of less than about 2%. Under such conditions of low sulfate and phosphate contamination, the alkali metal fluoride recycled within the system is not contaminated with sulfate and phosphate at an intolerably excessive rate.

Using this alternate recovery route, the treatment of the waste gases by scrubbing is similar to that previously described. The waste gas stream is scrubbed with an aqueous solution having an adjusted pH in the range of 2 to 4. The pH is controlled by the addition of ammonia. When the particular waste gas stream is high in dust content, the solids are preferably removed prior to scrubbing, using an electrostatic precipitator, filter, or similar dust removal device. The gases are then passed through the scrubber. The scrubber liquor, continuously withdrawn from the scrubber system, is ammoniated, causing the conversion of absorbed fluorine values to ammonium fluoride with the resulting precipitation of silica. The ammoniation is effected by the addition of ammonia to the scrubber liquor to increase the pH to at least eight.

After ammoniating, the liquor is filtered to remove the precipitated products and suspended solids, retaining the filtrate for subsequent processing. The filtrate is an ammonium fluoride solution having a concentration varying between about 10 percent and 50 percent by weight of ammonium fluoride.

Alkali metal fluoride is subsequently added to the filtrate in an amount sufficient to form alkali metal bifluoride with the fluoride values contained therein. This reaction proceeds with equal molar amounts of reactants by one of several procedures.

A. Thermal conversion to alkali metal bifluoride

One method of effecting the reaction to the alkali metal bifluoride is to heat the aqueous solution to a temperature sufficient to volatilize water and ammonia. By heating an aqueous solution of ammonium fluoride and alkali metal fluoride to temperatures of about 150 degrees centigrade to 230 degrees centigrade while permitting the escape of water and ammonia, conversion is effected to the alkali metal bifluoride.

B. *Aqueous solution reacted with molten alkali metal fluoride salt*

Another method of effecting the reaction of ammonium fluoride and an alkali metal fluoride to form the alkali metal bifluoride salt is to conduct the reaction in a medium of molten alkali metal bifluoride salt, such as potassium bifluoride. To effect the reaction, potassium bifluoride is heated and maintained at a temperature of 240 degrees centigrade to 270 degrees centigrade while an aqueous solution of ammonium fluoride and potassium fluoride is injected or sprayed into the molten bath. Steam and ammonia are flashed from the reaction mixture, as the reaction betwen ammonium fluoride and the alkali metal fluoride is effected, producing additional potassium bifluoride.

It is preferred to use a second reactor through which the volatilized gases are conveyed and wherein the fluorine values volatilized along with ammonia and water are reacted with part of the ammonia. These fluorine values are thus retained by forming an ammonium fluoride salt which condenses within the reactor. The internal temperature of the reactor is controlled between 100 degrees centigrade and 140 degrees centigrade to favor reaction of ammonia and hydrogen fluoride, while permitting water and excess ammonia to pass through the reactor. The reaction of hydrogen fluoride with ammonia produces ammonium fluoride salts which are then returned to the high temperature reactors as a melt. Highly efficient and rapid production of potassium bifluoride is maintained in this manner.

C. *Reaction of aqueous ammonium fluoride with solid alkali metal fluoride*

A further method of producing alkali metal bifluoride from the ammonium fluoride solution is to react the solution directly with an alkali metal fluoride which is maintained as a bed or slurry. It is preferred to accomplish this reaction by injecting ammonium fluoride solution into a stirred reactor containing dry granular or an aqueous slurry alkali metal fluoride maintained at a temperature of about 180 degrees centigrade to about 240 degrees centigrade. The injection of the aqueous ammonium fluoride solution into the reactor bed results in the volatilization of ammonia and water. In addition, some hydrogen fluoride is also liberated. To reduce the loss of hydrogen fluoride, it is preferred to again conduct the vapors liberated from the stirred reactor bed to a second reactor having an internal temperature controlled between about 100 degrees centigrade to 140 degrees centigrade. This reactor permits the passage of water vapor without condensation and effects the reaction of hydrogen fluoride with the excess of ammonia present. An ammonium fluoride salt is formed which is returned to the first reactor as a molten composition.

The reaction of aqueous ammonium fluoride with a stirred alkali metal bed can be maintained as a continuous or batch process. In the continuous operation, anhydrous alkali metal bifluoride is continuously withdrawn from the reactor while aqueous ammonium fluoride and additional alkali metal fluoride are added to the reactor. It has been found that potassium fluoride is the preferred alkali metal fluoride used in this reaction. When sodium fluoride is used, the reaction is less efficient. Using this process, an attempt is not made to convert all of the alkali metal fluoride to alkali metal bifluoride, but rather to effect sufficient and economical conversion such as up to about 90 percent alkali metal bifluoride and 10 percent alkali metal fluoride and in so doing, to evolve substantially all the excess ammonia and water.

Each of the above described methods of effecting the reaction of aqueous ammonium fluoride with an alkali metal fluoride produce ammonia and water as volatilization products during the reaction. These products constitute valuable reactants which can readily be recycled to the scrubbing liquor or ammoniation step previously described. In a continuous reaction of the type described, the recycle of ammonia and water is efficiently maintained so that only minor additional amounts of ammonia and water are required.

Having formed the alkali metal bifluoride, anhydrous hydrogen fluoride is recovered by methods previously described. One method is the pyrolysis of the alkali metal bifluoride by subjecting to heat at temperatures between about 270 degrees centigrade to about 600 degrees centigrade. This pyrolysis effects the decomposition of the alkali metal bifluoride to a solid alkali metal fluoride and gaseous hydrogen fluoride which is readily recovered therefrom.

Another method of recovering anhydrous hydrogen fluoride from the alkali metal bifluoride when the alkali metal bifluoride is potassium bifluoride, is by the atomized spraying into a high temperature reactor as previously described.

The thermal decomposition of alkali metal bifluoride results in a solid alkali metal fluoride salt which is readily recycled to various steps in the reaction process. Efficient continuous operation of the process described herein results in only minor losses of alkali metal fluoride, thus requiring only minor quantities of alkali metal fluoride salt as replacement.

In the reactions described herein, the alkali metal fluorides used can be any alkali metal fluoride, such as lithium, sodium, potassium, rubidium and cesium. In reactions requiring a melt of the bifluoride salt, potassium bifluoride is the alkali metal bifluoride used. The melting point of potassium bifluoride is about 239 degrees centigrade for the pure product. Products having lesser amounts of hydrogen fluoride have different melting points ranging from a low of 229.5 degrees centigrade for the eutectic mixture of 4.1% KF–95.9% $KHF_2$, to higher temperatures as HF content decreases. Therefore, the exact melting point is dependent on the hydrogen fluoride content.

The invention will be readily understood with reference to the following examples which are illustrative of certain preferred embodiments thereof. Unless otherwise indicated, all temperatures are in degrees centigrade and all parts and percentages are by weight.

EXAMPLE 1

Waste gases produced by the acidulation and calcination of phosphate rock containing 1.2 percent by weight of fluorine values were conducted through an aqueous scrubber system to effect removal of the fluorine values. The aqueous scrubbing liquor was originally water which became more concentrated in fluorine values during the scrubbing operation. The scrubber liquid was maintained at a pH of 3 during the scrubbing operation by adjusting with ammonia. Aqueous scrubber liquid withdrawn from the system had a fluorine content of 15.6 percent. Ammonia was added to the scrubber liquid withdrawn from the scrubbing system so as to increase the pH to about 9. After ammoniation, the scrubber liquor was filtered, the filtrate being retained for further processing.

The filtrate comprised a 30 percent aqueous solution of ammonium fluoride. Dehydration, decomposition and thermal conversion of the filtrate solution was accomplished by heating the ammonium fluoride solution in a dehydration vessel having stirring means, thermometer, and means for conveying gases to a reactor maintained at a temperature of 128 degrees centigrade plus or minus 2 degrees centigrade. The aqueous solution was heated in the dehydration vessel at atmospheric pressure to a temperature of 170 degrees centigrade to 185 degrees centigrade. While maintaining the temperature at 170 degrees centigrade to 185 degrees centigrade in the dehydration vessel, ammonia, water and a lesser amount of hydrogen fluoride were volatilized. The volatilized gases were passed through the reactor wherein hydrogen fluoride was reacted with ammonia, the resulting product being condensed in the reactor. This ammonia fluoride condensate was returned to the dehydration vessel while the excess water and ammonia were passed through the reactor.

Dehydration was continued until a substantially anhydrous ammonium bifluoride product was obtained in the dehydration vessel. The process required about one hour in the temperature range of 170 degrees centigrade to 185 degrees centigrade to obtain an ammonium bifluoride equal to 95 percent ammonium bifluoride and containing less than 0.2 percent water. Upon completion of the dehydration, the temperature was increased to the range of 210 degrees centigrade to 230 degrees centigrade at which temperature ammonium bifluoride was distilled from the dehydration vessel. The distilled ammonium bifluoride product was then reacted with sodium fluoride.

The reaction with sodium fluoride was effected by contacting molten ammonium bifluoride with granular sodium fluoride in a stirred reactor maintaining the temperature at 150 degrees centigrade. Sodium fluoride was present in about a 20 percent excess over that required by the equation: $2NaF + NH_4HF_2 \rightarrow 2NaHF_2 + NH_3$. Gases from the stirred reactor were conducted to a second reactor maintained at a temperature of 130 degrees centigrade. This second reactor was similar in function to that used in the previous dehydration step. The second reactor effected the reaction of volatilized fluorine values with ammonia, forming an enriched ammonium fluoride melt which was returned to the stirred reactor for further reaction.

During the process, the temperature of the stirred reactor, containing the ammonium bifluoride-sodium fluoride mix, was increased to 230 degrees centigrade, effecting the formation of sodium bifluoride. The ammonia evolved during this reaction was recovered for further ammoniation of scrubber liquors after passing through the second reactor.

The reaction was allowed to proceed until about 80 to 85 percent of the ammonium values originally present as ammonium bifluoride had been evolved. The balance of the ammonia remained in the reaction product as unreacted ammonium bifluoride. In order to reduce the ammonia content of the sodium fluoride to a low level the charge was held at 230 degrees centigrade and the vapors allowed to bypass the second reactor. The unreacted ammonium bifluoride was then distilled away from the formed sodium bifluoride and recovered for recycle.

Having formed sodium bifluoride in substantially pure form, the temperature was increased to 280 degrees centigrade to commence liberation of hydrogen fluoride. Heating was continued until the liberation of hydrogen fluoride was substantially completed. The hydrogen fluoride was recovered and the sodium fluoride was recycled for further reaction with ammonium bifluoride.

The hydrogen fluoride recovered was substantially anhydrous and of low sulfate and phosphate contamination.

EXAMPLE 2

Ammonium bifluoride prepared as in Example 1 was conducted as a gas from the distillation procedure of Example 1 directly to a stirred reactor containing granular potassium fluoride maintained at a temperature of 140 degrees centigrade to 150 degrees centigrade. The stirred reactor was equipped with a gas conveying means through which the volatilized decomposition products were conveyed to a second reactor. The second reactor was maintained at a temperature of 128 degrees centigrade.

Gaseous ammonium bifluoride was fed into the stirred reactor containing potassium fluoride and a reaction was effected by maintaining a temperature of 140 degrees centigrade to 150 degrees centigrade to form potassium bifluoride and volatilizing ammonia. In addition to ammonia being volatilized, a lesser amount of hydrogen fluoride was also volatilized. The volatilized gases were conveyed to the second reactor wherein a hydrogen fluoride enriched ammonium fluoride salt was formed and condensed. The condensate was returned to the stirred reactor while the excess ammonia was passed through the second reactor and recycled to the step of ammoniating scrubber liquors.

After passing gaseous ammonium bifluoride into the potassium fluoride reaction bed in an equal molar ratio of ammonium bifluoride to potassium fluoride, no additional ammonium bifluoride was fed into the stirred reactor. Heating was continued at 140 degrees centigrade to 150 degrees centigrade until ammonia ceased to be liberated from the stirred reactor. The temperature was then increased to 250 degrees centigrade to liquefy the potassium bifluoride. The liquid potassium bifluoride was then decomposed by spraying the melt into the top of a high temperature decomposer having an internal temperature of 750 degrees centigrade. The potassium bifluoride spray produced finely divided droplets which were carried through the heated reactor. The heated reactor was of sufficient diameter and the angle of spray such that the particles did not impinge on the side walls of the reactor but were swept through the reactor by volatilization of hydrogen fluoride from the particles. The gas stream and suspended solids were conveyed to a hot cyclone separator from which potassium fluoride was removed and hydrogen fluoride recovered as end product. The potassium fluoride was then recycled for further absorption of hydrogen fluoride.

EXAMPLE 3

The process of Example 1 was again used to recover fluorine values from waste gases and to form ammonium bifluoride. The ammonium bifluoride formed was conducted directly from the distillation step to a molten mass of potassium bifluoride maintained at a temperature of 250 degrees centigrade. Finely divided potassium fluoride was fed into a molten mass of potassium bifluoride in a first reactor at a rate of 13 parts of potassium fluoride per 7 parts of ammonium bifluoride. This feed rate corresponds to a slight molar excess of potassium fluoride. The volatilized gases were conveyed to a second reactor as described in Example 2, to effect the reaction and recovery of the small amount of hydrogen fluoride which was volatilized with ammonia from the molten mass. Molten potassium bifluoride was continuously withdrawn from the first reactor at a rate equal to the feed rate and passed to the high temperature decomposer described in Example 2. Hydrogen fluoride liberated in the decomposer was recovered and the potassium fluoride was recycled ts in Example 2.

EXAMPLE 4

A waste gas stream was scrubbed as in Example 1. The pH of the scrubbing liquor was maintained at 2.5 to minimize the absorption of sulfur dioxide. The pH was adjusted, as required, by additions of ammonia. Scrubber liquid having a fluorine concentration of 10.3 percent was continuously withdrawn from the scrubbing system and ammoniated by addition of ammonia to increase the pH to above 8.0. The aqueous solution was filtered and the filtrate was found to comprise 20 percent ammonium fluoride. Sodium fluoride was then added to the filtrate in an equal molar amount to the ammonium fluoride in the filtrate. The mixture was then heated in a reactor to volatilize the water and ammonia and to form sodium bifluoride. The gases evolved were conducted to a second reactor held at 128 degrees centigrade wherein the volatilized fluoride values were caused to react with ammonia to form an ammonium fluoride melt which was returned to the first reactor. The first reactor was maintained at about 165 degrees centigrade until all of the water was evolved and a conversion of ammonium fluoride to ammonium bifluoride was substantially effected. At this point, the reaction of ammonium bifluoride thus formed with sodium fluoride to yield sodium bifluoride was only partially complete.

The reaction charge was then brought to a temperature of 230 degrees centigrade to effect maximum conversion to sodium bifluoride. After effecting an 80 percent to 85 percent conversion to sodium bifluoride, the unreacted ammonium bifluoride was distilled from the sodium bifluoride by bypassing the second reactor as in Example 1. The ammonia values were again recycled. The sodium bifluoride product was then further heated to a temperature of 270 degrees centigrade to 300 degrees centigrade to liberate hydrogen fluoride. Anhydrous hydrogen fluoride was recovered and the sodium fluoride residue was recycled for further reaction with ammonium fluoride solution.

EXAMPLE 5

The 20 percent ammonium fluoride filtrate of Example 4 was reacted with potassium fluoride to form potassium bifluoride by adding an equal molar amount of potassium fluoride to the filtrate and injecting the solution into a mass of molten potassium bifluoride. The molten potassium bifluoride was maintained at a temperature of 250 degrees centigrade. The injection of the aqueous mixture of ammonium fluoride and potassium fluoride resulted in a flash evaporation of ammonia and water and a conversion of the potassium fluoride in the solution to potassium bifluoride. In the flash evaporation and conversion of potassium fluoride to potassium bifluoride, a minor proportion of hydrogen fluoride was volatilized with the ammonia and water. The gases evolved during the flash evaporation were passed through a second reactor maintained at a temperature of 125 degrees centigrade plus or minus 3 degrees centigrade. A reaction of hydrogen fluoride with the excess ammonia was effected in the reactor to produce an ammonium fluoride salt. By using a second reactor as described, the loss of fluorine values was greatly diminished.

This procedure was readily maintained as a continuous reaction of flash evaporation and thermal conversion. Molten potassium bifluoride was continuously withdrawn at a rate commensurable with the addition of the aqueous feed solution based on the fluoride content of the aqueous solution.

The molten potassium bifluoride produced by the flash evaporation method was then decomposed as described in Example 2. Hydrogen fluoride was recovered from the decomposer and the potassium fluoride recycled for further reaction with ammonium fluoride.

EXAMPLE 6

Ammonium bifluoride was prepared as described in Example 1. Vaporous ammonium bifluoride was then reacted with sodium fluoride by injecting the vapor into a stirred bed of hot granular sodium fluoride. The reaction bed was maintained at an elevated temperature of 185 degrees centigrade to 200 degrees centigrade to expedite the reaction.

During the reaction of ammonium bifluoride with sodium fluoride, the gases evolved, e.g., ammonia and minor amounts of fluorine values, were passed through a second reactor maintained at a temperature of 128 degrees centigrade to 130 degrees centigrade. A reaction of the fluorine values with the excess ammonia was effected in the reactor to produce an ammonium fluoride melt which was returned to the ammonium bifluoride source for recycle to the sodium fluoride bed.

The reaction was maintained in a continuous manner by continuously withdrawing sodium bifluoride composition from the top of the absorption bed while continuously injecting vaporous ammonium bifluoride and granular sodium fluoride into the bottom of the bed. It was found to be preferable to subject the withdrawn sodium bifluoride to a short heating period at a temperature of about 230 degrees centigrade to remove any unreacted ammonium bifluoride. The withdrawn sodium bifluoride composition was subsequently further heated to a temperature of 280 degrees centigrade to 375 degrees centigrade to effect the decomposition and volatilization of hydrogen fluoride.

While there have been described various embodiments of the present invention, the methods and elements described are not intended to be understood as limiting the scope of the invention, as it is realized that changes therewithin are possible. It is intended that each element recited in any of the following claims is to be understood as referring to all equivalent elements for accomplishing substantially the same results in substantially the same or equivalent manner, it being intended to cover the invention broadly in whatever form its principles may be utilized.

What is claimed is:

1. A method for recovering substantially anhydrous hydrogen fluoride from an aqueous ammonium fluoride solution which contains a total of sulfate and phosphate values in an amount of at least 2.0% by weight which comprises heating the ammonium fluoride solution at a temperature of from about 130 to 230 degrees centigrade to volatilize therefrom a gaseous mixture of ammonia, HF and water vapor, passing the thus-volatilized gas mixture through a first reaction zone maintained at a temperature of from about 100 to 140 degrees centigrade, reacting HF and a portion of the ammonia in said reaction zone to form an ammonium bifluoride product, removing unreacted ammonia and water vapor from the reaction zone, returning the thus-formed ammonium bifluoride product to the ammonium fluoride solution being heated, continuing this process until substantially all of the water has been removed from the ammonium fluoride solution and the reaction product returned is a mixture of ammonium fluoride salts of which at least 70% by weight is ammonium bifluoride, with the sulfate and phosphate values, heating the resulting substantially anhydrous ammonium bifluoride product at a temperature from about 210 to 225 degrees centigrade, distilling off ammonium bifluoride by said heating, recovering a substantially pure ammonium bifluoride product as the distillate while retaining the sulfate and phosphate values in the distillation residue, reacting the thus-produced ammonium bifluoride with an alkali metal fluoride to produce an alkali metal bifluoride and a gaseous decomposition product comprised of ammonia, HF and water vapor, separating alkali metal bifluoride from the gaseous decomposition product, passing the gaseous decomposition product through a second reaction zone maintained at a temperature of from about 100 to 140 degrees centigrade, reacting HF and at least a portion of the ammonia in said second reaction zone to form an ammonium bifluoride product, removing unreacted ammonia and water vapor from the second reaction zone, returning the thus-formed ammonium bifluoride product to the ammonium bifluoride-alkali metal fluoride reaction, heating the alkali metal bifluoride which has been formed at a temperature sufficient to effect the thermal decomposition thereof to form substantially anhydrous hydrogen fluoride and an alkali metal fluoride, and recovering the thus-formed substantially anhydrous hydrogen fluoride.

2. The method as claimed in claim 1 wherein the ammonium bifluoride is reacted with the alkali metal fluoride by conducting a gaseous ammonium bifluoride into an alkali metal fluoride bed maintained at a temperature of from about 150 to 225 degrees centigrade, to form the alkali metal bifluoride and the gaseous decomposition product.

3. The method as claimed in claim 2 wherein the alkali metal bifluoride produced is thermally decomposed to an alkali metal fluoride and hydrogen fluoride by heating at a temperature of from about 270 to 600 degrees centigrade to effect the decomposition thereof.

4. The method as claimed in claim 1 wherein the ammonium bifluoride is reacted with potassium fluoride in a molten potassium bifluoride medium by feeding ammonium bifluoride and potassium fluoride into the molten potassium bifluoride medium in a substantially equal molar ratio to produce potassium bifluoride and the gaseous decomposition product.

5. The method as claimed in claim 4 wherein the potassium bifluoride formed is sprayed in finely divided form into a reactor having an internal temperature of from 400 to 1000 degrees centigrade to effect an in situ decomposition of potassium bifluoride to gaseous hydrogen fluoride and potassium fluoride.

6. The method as claimed in claim 1 wherein the aqueous ammonium fluoride solution is formed by scrubbing a waste gas stream containing fluoride values, sulfate values and phosphate values with an aqueous solution maintained at a pH of from 2 to 4, absorbing the fluorine values, sulfate values, and phosphate values in the scrubbing liquor, ammoniating the resulting scrubbing liquor to a pH of at least 8 and filtering the ammoniated scrubbing liquor to obtain the said ammonium fluoride solution as the filtrate.

References Cited

UNITED STATES PATENTS

| | | | |
|---|---|---|---|
| 2,141,773 | 12/1938 | Strathmeyer | 23—88 |
| 2,156,273 | 5/1939 | Bozarth | 23—88 |
| 2,446,484 | 8/1948 | McClenahan | 23—88 |
| 2,602,726 | 7/1952 | Winter | 23—88 |
| 2,780,522 | 2/1957 | Gloss et al. | 23—88 |
| 2,816,818 | 12/1957 | Gross | 23—88 |
| 3,005,684 | 10/1961 | Riedl et al. | 23—88 |
| 3,089,752 | 5/1963 | Clark | 23—88 |
| 3,101,254 | 8/1963 | Cunningham | 23—153 |
| 3,140,152 | 7/1964 | Rucker | 23—153 |
| 3,195,979 | 7/1965 | Burkert et al. | 23—153 |
| 3,212,849 | 10/1965 | Kauders et al. | 23—88 |

OSCAR R. VERTIZ, *Primary Examiner.*

EDWARD STERN, *Examiner.*